(12) United States Patent
Smits

(10) Patent No.: US 7,412,119 B2
(45) Date of Patent: Aug. 12, 2008

(54) APPARATUS AND METHOD FOR MAKING FLEXIBLE WAVEGUIDE SUBSTRATES FOR USE WITH LIGHT BASED TOUCH SCREENS

(75) Inventor: Gerard Dirk Smits, Los Gatos, CA (US)

(73) Assignee: Poa Sana Liquidating Trust, Mountain View, CA (US)

( * ) Notice: Subject to any disclaimer, the term of this patent is extended or adjusted under 35 U.S.C. 154(b) by 606 days.

(21) Appl. No.: 10/923,274

(22) Filed: Aug. 20, 2004

(65) Prior Publication Data

US 2006/0002655 A1 Jan. 5, 2006

Related U.S. Application Data

(63) Continuation-in-part of application No. 10/923,550, filed on Aug. 20, 2004.

(60) Provisional application No. 60/584,947, filed on Jun. 30, 2004, provisional application No. 60/584,728, filed on Jun. 30, 2004.

(51) Int. Cl.
*G02B 6/12* (2006.01)
*G02B 6/10* (2006.01)
*G06F 3/041* (2006.01)
*G06F 3/042* (2006.01)

(52) U.S. Cl. .................. 385/14; 385/129; 345/173; 345/175; 345/176

(58) Field of Classification Search .................. 385/14
See application file for complete search history.

(56) References Cited

U.S. PATENT DOCUMENTS

| | | | |
|---|---|---|---|
| 4,746,770 A | 5/1988 | McAvinney | 178/18.09 |
| 5,414,413 A | 5/1995 | Tamaru et al. | 345/175 |
| 5,914,709 A * | 6/1999 | Graham et al. | 345/179 |
| 6,181,842 B1 | 1/2001 | Francis et al. | |
| 6,343,171 B1 * | 1/2002 | Yoshimura et al. | 385/50 |
| 6,351,260 B1 | 2/2002 | Graham et al. | 345/179 |
| 2001/0031122 A1 * | 10/2001 | Lackritz et al. | 385/131 |
| 2003/0179979 A1 * | 9/2003 | Ouchi | 385/14 |

FOREIGN PATENT DOCUMENTS

EP 1298462 2/2003

* cited by examiner

*Primary Examiner*—Hemang Sanghavi
*Assistant Examiner*—Kajli Prince
(74) *Attorney, Agent, or Firm*—Beyer Law Group LLP

(57) ABSTRACT

Flexible optical waveguide substrates that can be used with touch screen displays. The waveguide substrates include a flexible base material. A first optical layer having a first index of refraction value is formed on the flexible base material. A second optical layer is then formed on the first optical layer, the second optical layer being patterned to form a plurality of optical elements and waveguides respectively. The second optical layer also has a second index of refraction value higher than the first index of refraction value. Lastly, a third optical layer is formed on the second optical layer. The third optical layer has a third index of refraction value lower than the second index of refraction value. The high N second layer is therefore sandwiched between the lower N first and third layers, creating an internally reflective surface wherever the high N and low N materials are in contact. The base material and first, second and third optical layers thus form a flexible waveguide substrate.

22 Claims, 11 Drawing Sheets

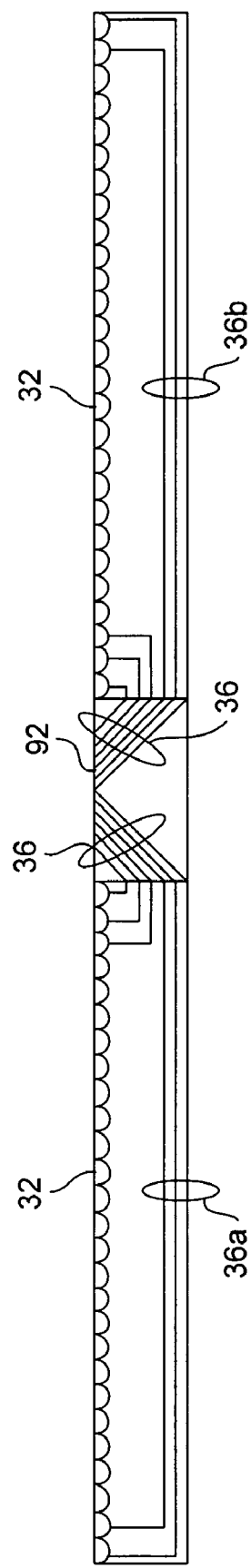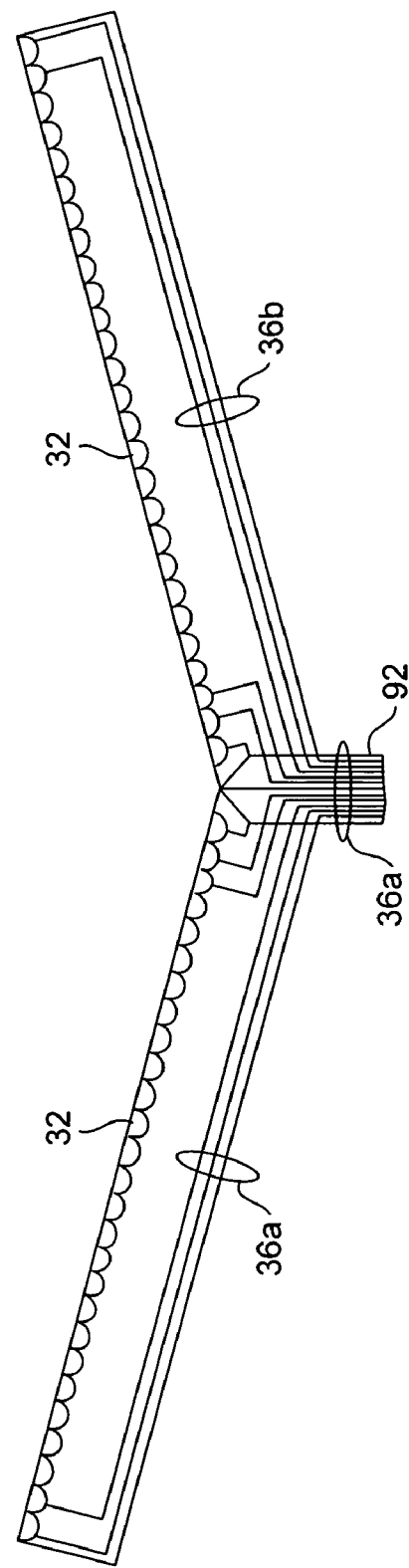
FIG. 7A
FIG. 7B

APPARATUS AND METHOD FOR MAKING FLEXIBLE WAVEGUIDE SUBSTRATES FOR USE WITH LIGHT BASED TOUCH SCREENS

RELATED APPLICATIONS

This patent application claims the benefit of Provisional Patent Application Ser. No.: 60/584,947, filed Jun. 30, 2004, which is incorporated herein by reference for all purposes. This application is also a continuation-in-part of U.S. application Ser. No. 10/923,550, entitled "Apparatus and Method for a Folded Optical Element Waveguide for Use with Light Based Touch Screens", (which claims the benefit of Provisional Patent Application Ser. No.: 60/584,728, filed Jun. 30, 2004), filed on Aug. 20, 2004, in the name of Gerard D. Smits, assigned to the assignee of the present invention, and incorporated in its entirety herein by reference.

BACKGROUND OF THE INVENTION

1. Field of the Invention

The present invention relates generally light based to touch screen displays, and more particularly, to an apparatus and method for making an optical element waveguide that can be used with touch screen displays.

2. Description of the Related Art

User input devices for data processing systems can take many forms. Two types of relevance are touch screens and pen-based screens. With either a touch screen or a pen-based screen, a user may input data by touching the display screen with either a finger or an input device such as a stylus or pen.

One conventional approach for providing a touch or pen-based input system is to overlay a resistive or capacitive film over the display screen. This approach has a number of problems. Foremost, the film causes the display to appear dim and obscures viewing of the underlying display. To compensate, the intensity of the display screen is often increased. However, in the case of most portable devices, such as cell phones, personal digital assistants, and laptop computers, high intensity screens are usually not provided. If they are provided, the added intensity requires additional power, reducing the life of the battery of the device. The films are also easily damaged. These films are therefore not ideal for use with pen or stylus input devices. The motion of the pen or stylus may damage or tear the thin film. This is particularly true in situations where the user is writing with a significant amount of force. In addition, the cost of the film scales dramatically with the size of the screen. With large screens, the cost is typically prohibitive.

Another approach to providing touch or pen-based input systems is to use an array of source Light Emitting Diodes (LEDs) along two adjacent X-Y sides of an input display and a reciprocal array of corresponding photodiodes along the opposite two adjacent X-Y sides of the input display. Each LED generates a light beam directed to the reciprocal photodiode. When the user touches the display, with either a finger or pen, the interruptions in the light beams are detected by the corresponding X and Y photodiodes on the opposite side of the display. The data input is thus determined by calculating the coordinates of the interruptions as detected by the X and Y photodiodes. This type of data input display, however, also has a number of problems. A large number of LEDs and photodiodes are required for a typical data input display. The position of the LEDs and the reciprocal photodiodes also need to be aligned. The relatively large number of LEDs and photodiodes, and the need for precise alignment, make such displays complex, expensive, and difficult to manufacture.

Yet another approach involves the use of polymer waveguides to both generate and receive beams of light from a single light source to a single array detector. These systems tend to be complicated and expensive and require alignment between the transmit and receive waveguides and the optical elements and the waveguides. The waveguides are usually made using a lithographic process that can be expensive or difficult to source. In addition, the waveguides are typically flat. As a consequence, the bezel around the display is relatively wide. See for example U.S. Pat. No. 5,914,709.

Accordingly, there is a need for an apparatus and method for making inexpensive, flexible optical waveguides that can be used with touch screen displays.

SUMMARY OF THE INVENTION

The present invention relates to an apparatus and method for making inexpensive, flexible optical waveguides that can be used with touch screen displays. The apparatus includes a flexible base material. A first optical layer having a first index of refraction value is formed on the flexible base material. A second optical layer is then formed on the first optical layer, the second optical layer being patterned to form a plurality of optical elements and waveguides respectively. The second optical layer also has a second index of refraction value higher than the first index of refraction value. Lastly, a third optical layer is formed on the second optical layer. The third optical layer has a third index of refraction value lower than the second index of refraction value. The high N second layer is therefore sandwiched between the lower N first and third layers, creating an internally reflective surface wherever the high N and low N materials are in contact. The base material and first, second and third optical layers thus form a flexible waveguide substrate.

BRIEF DESCRIPTION OF THE DRAWINGS

The invention, together with further advantages thereof, may best be understood by reference to the following description taken in conjunction with the accompanying drawings in which:

FIGS. 7A and 7B are diagrams illustrating another folded waveguide according to the present invention.

In the figures, like reference numbers refer to like components and elements.

DETAILED DESCRIPTION OF THE INVENTION

Figure 1:
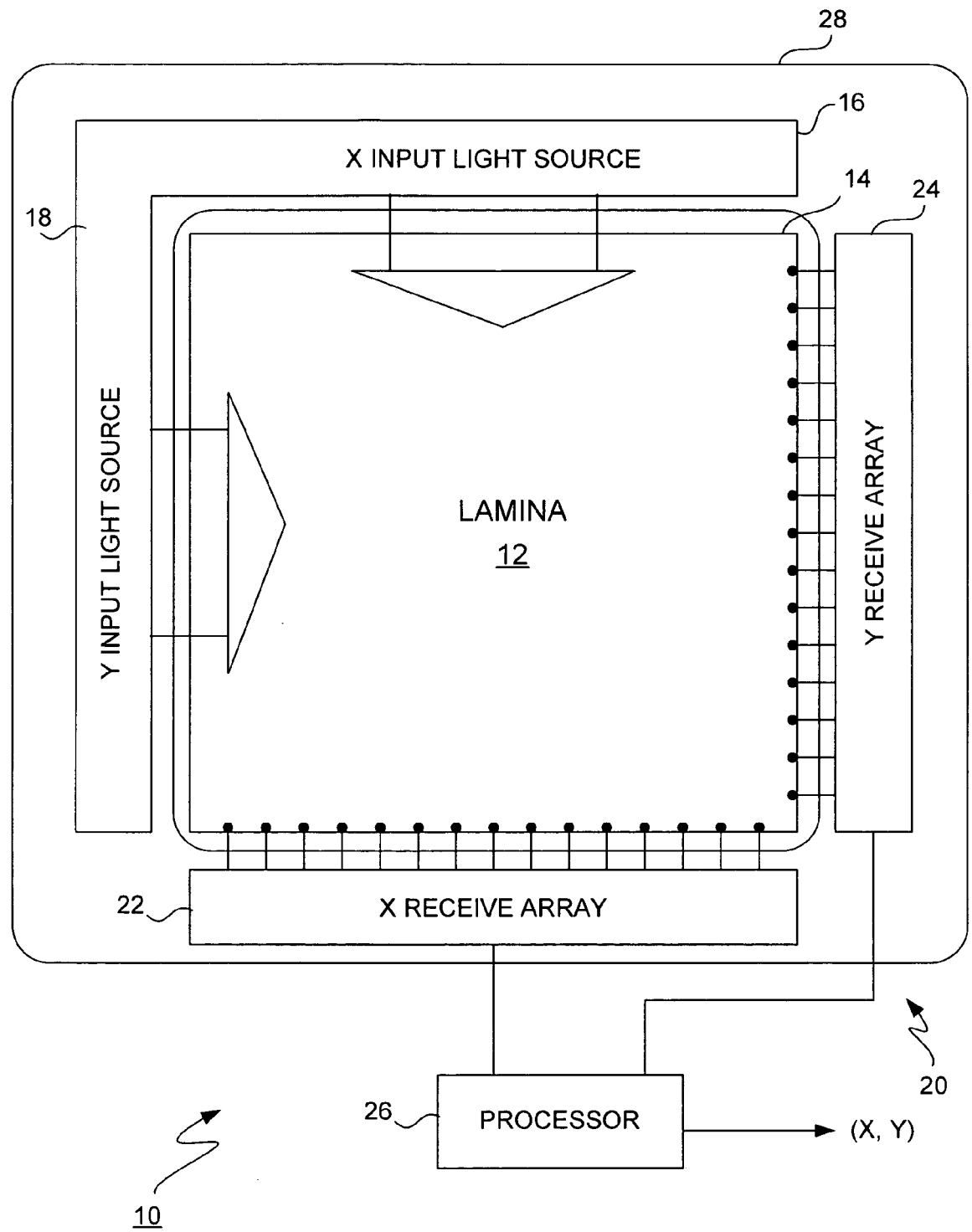
FIG. 1 is a touch screen display device.

Referring to FIG. 1, a touch screen data input device according to one embodiment of the invention is shown. The data input device 10 defines a continuous sheet or "lamina" 12 of light in the free space adjacent a touch screen 14. The lamina 12 of light is created by X and Y input light sources 16 and 18 respectively. An optical position detection device 20, optically coupled to the lamina 12 of light, is provided to detect data entries to the input device by determining the location of interrupts in the lamina 12 caused when data is entered to the input device. The optical position detection device 20 includes an X receive array 22, a Y receive array 24, and a processor 26. The X and Y input light sources 16 and 18 and the X and Y receive arrays 22 and 24 are formed by a single waveguide substrate 28 that surrounds the lamina 12 and the touch screen 14.

During operation, a user makes a data entry to the device 10 by touching the screen 14 using an input device, such as a pen, stylus or finger. During the act of touching the screen with the input device, the lamina 12 of light in the free space adjacent the screen is interrupted. The X receive array 22 and Y receive array 24 of the optical position detection device 20 detect the interrupt. Based on the X and Y coordinates of the interrupt, the processor 26 determines the data entry to the device 10. For more information on the data entry device 10, see co-pending, U.S. application Ser. No. 10/817,564, entitled Apparatus and Method for a Data Input Device Using a Light Lamina Screen and an Optical Position Digitizer, filed Apr. 1, 2004, and incorporated by reference herein for all purposes.

Figure 2A:
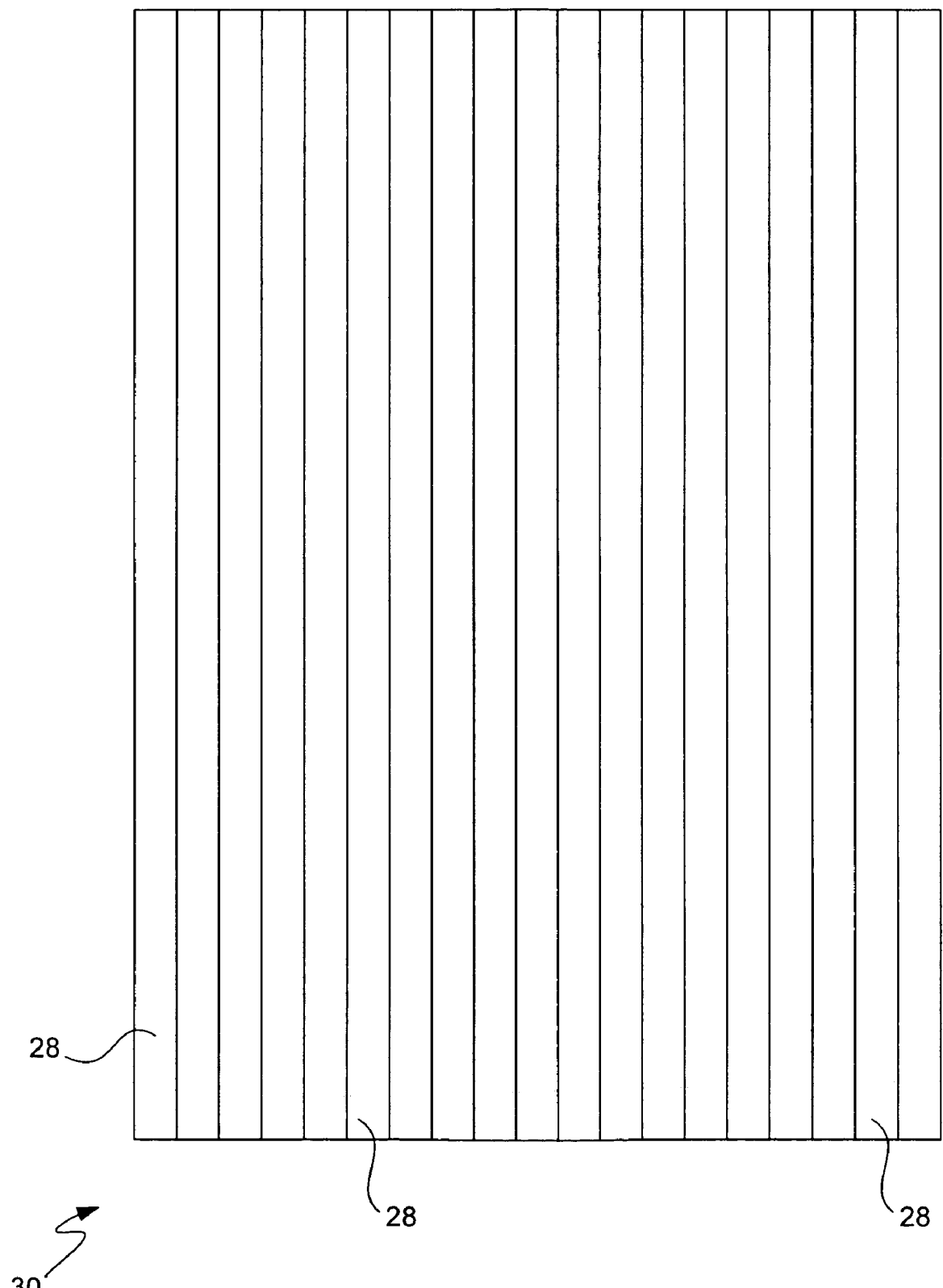
FIG. 2A is a sheet including a plurality of flexible waveguide substrates fabricated thereon according to one embodiment of the present invention.

Referring to FIG. 2A, a sheet 30 including a plurality of flexible waveguide substrates 28 fabricated thereon is shown. According to one embodiment, a plurality of waveguides 28 are fabricated on a single sheet 30. The individual substrates 28 are fabricated side-by-side in long, thin, strips on the surface of the sheet 30. After the substrates 28 are fabricated, the sheet 30 is cut, singulating the individual waveguide substrates 28. The sheet 30 can be cut using any one of a variety of well known techniques, for example using a knife, saw blade, etc. Details of the fabrication of the waveguides 28 on the sheet 30 are provided below.

Figure 2B:
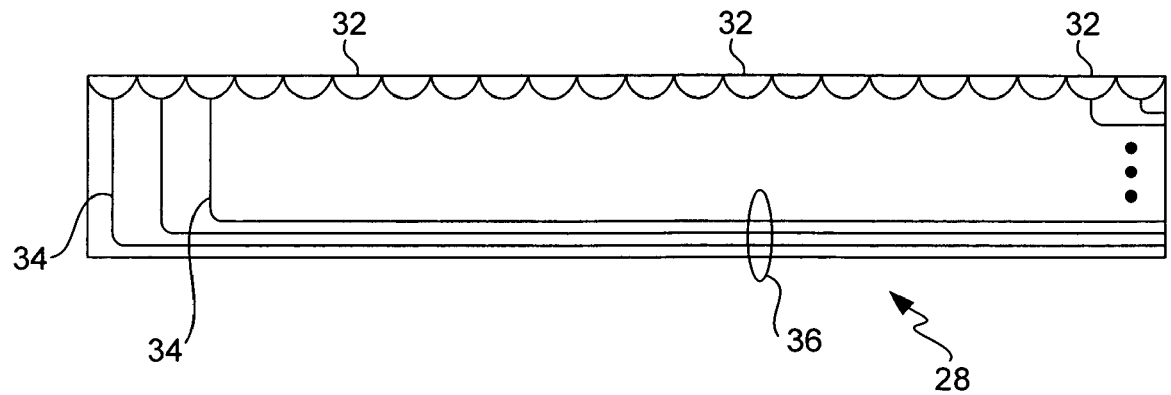
FIG. 2B illustrates a flexible waveguide substrate cut from the sheet of FIG. 2A.

Referring to FIG. 2B, a flexible waveguide substrate 28 cut from the sheet 28 is shown. As is evident in the figure, the waveguide substrate 28 includes a plurality of optical elements 32 provided on one side of the substrate 28. According to various embodiments, the optical elements 32 may include lenses, diffraction gratings, filters, bragg gratings, coupling horns, etc. A waveguide 34 is optically coupled to each optical element 32. The plurality waveguides 34 are grouped together and run in parallel along the length of the substrate 28 in what is sometimes referred to as a waveguide highway 36.

Figure 2C:
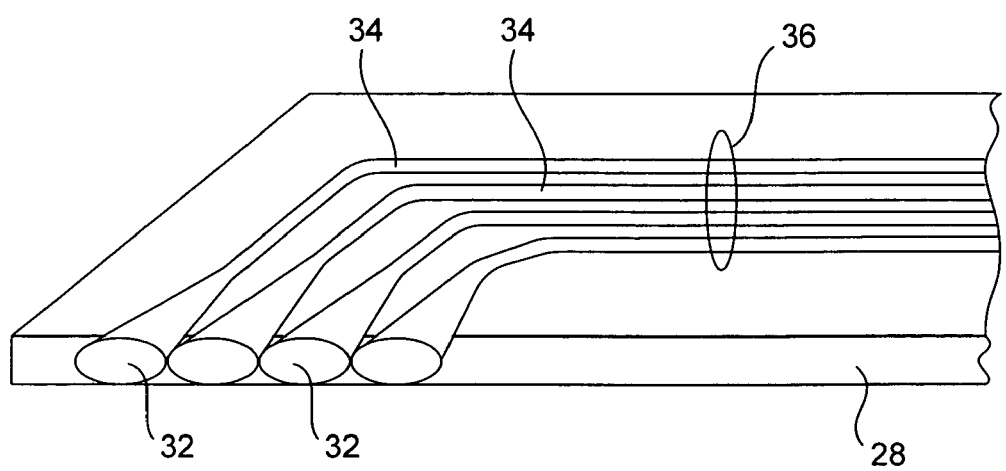
FIG. 2C is a perspective view of the flexible waveguide substrate cut from the sheet of FIG. 2A.

FIG. 2C is a perspective view of the flexible waveguide substrate 28. In this figure, the optical elements 32 are shown along one side of the substrate 28. The individual waveguides 34, optically coupled to the optical elements 32, are shown in grouped together along the optical highway 36. The individual waveguides 34 run the length of the substrate 28 (not shown in the figure).

Figure 2D:
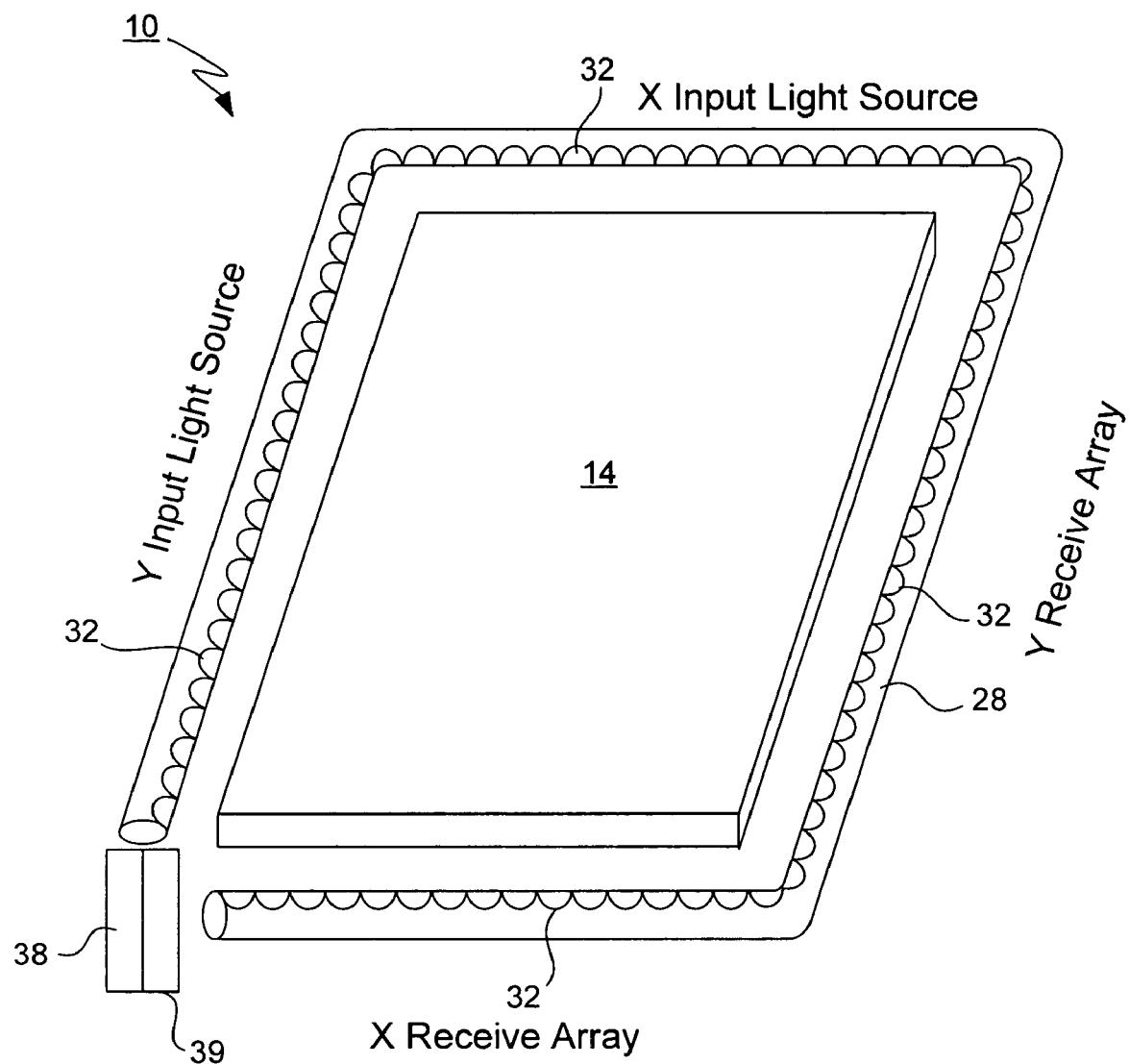
FIG. 2D is a perspective view of the application of the flexible waveguide substrate around a touch screen display.

Referring to FIG. 2D, a perspective view of the waveguide substrate 28 around a touch screen display 14 of input device 10 is shown. One application of the flexible waveguide substrates 28 is that they can readily be used to provide the X and Y input light sources 16, 18 and the X and Y receive arrays 22, 24 for the input device 10. As is shown in the figure, the waveguide substrate 28 is provided around the perimeter of the touch screen 14, with the optical elements 32 configured facing inward. Consequently, the optical elements 32 on the X and Y input light sides of the touch screen are used to create the lamina 12 of light above the touch screen 14. For the sake of simplicity, the individual waveguides 34 are not shown in the figure. Alternatively, the optical elements 32 on the X and Y receive sides of the display 14 are used to decipher data inputs by detecting interrupts in the lamina 12. A light source 38 provides light to the waveguides 34 coupled to the optical elements 32 along the light input sides of the touch screen 14. An imaging device 39, such as an MOS device or CCD, is provided adjacent the waveguides 34 coupled to the optical elements 32 along the X and Y receive sides of the touch screen 14.

Figure 3A:
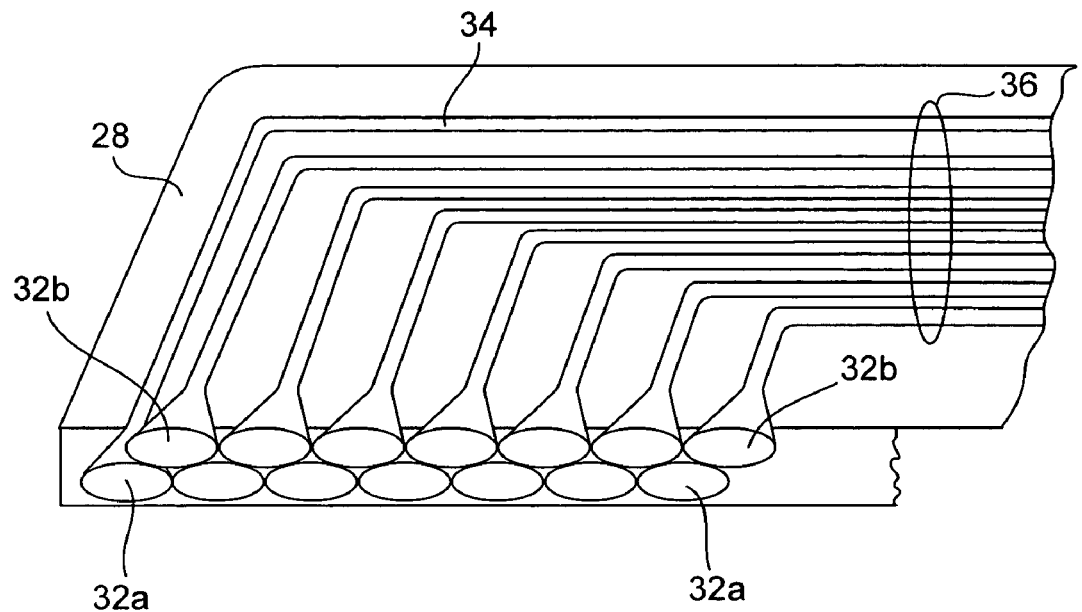
FIG. 3A is a perspective view of another flexible substrate according to another embodiment of the invention.

Referring to FIG. 3A, a multi-layer flexible waveguide substrate 28 according to another embodiment of the invention is shown. In this embodiment, the two layers of optical elements 32 are provided along one side of the substrate 28. A first or bottom layer of optical elements 32a are provided at spaced intervals. A second layer of optical elements 32b are provided above the first layer. The second layer of optical elements 32b are interleaved between the those of the first layer. Similar to the embodiment described above, the waveguides 34 of the optical elements 32a and 32b are grouped together in a highway 36 which runs the length of the substrate 28.

Figure 3B:
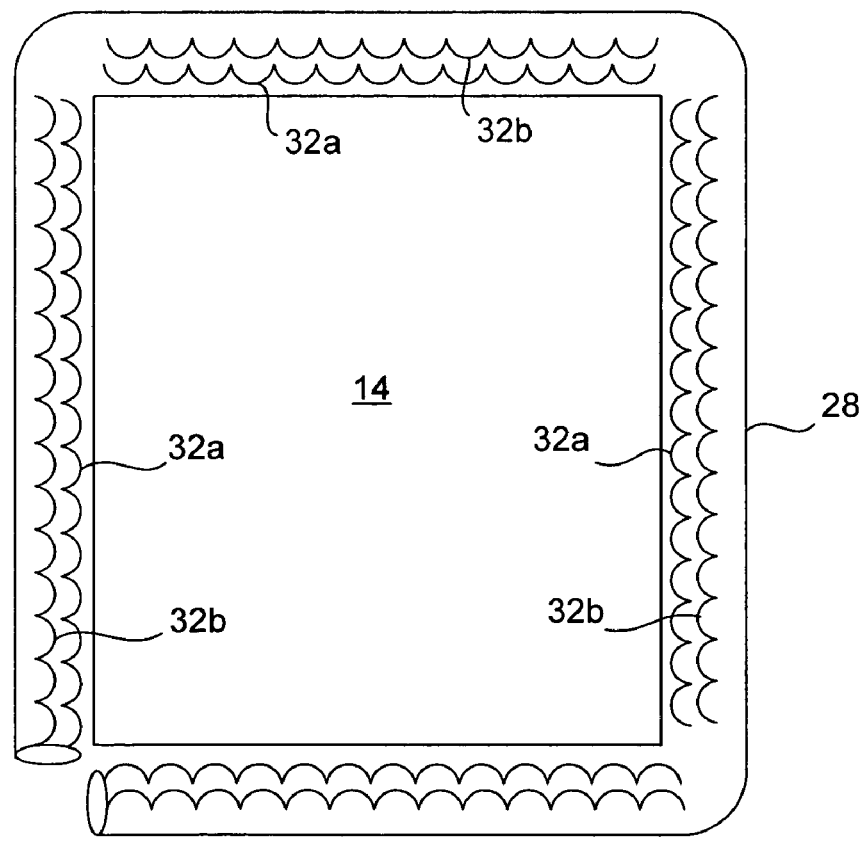
FIG. 3B is a diagram illustrating the flexible substrate of FIG. 3A used around a touch screen according to the present invention.

Referring to FIG. 3B, a diagram illustrating the multi-layer flexible substrate of FIG. 3A is shown. In the figure, the first layer of lenses 32a and the second layer of lenses 32b are shown around the periphery of touch screen 14. One advantage of the interleaved, two layered structure of FIG. 3A, is that it provides greater resolution for a given dimension of the optical elements 32.

Figure 3C:
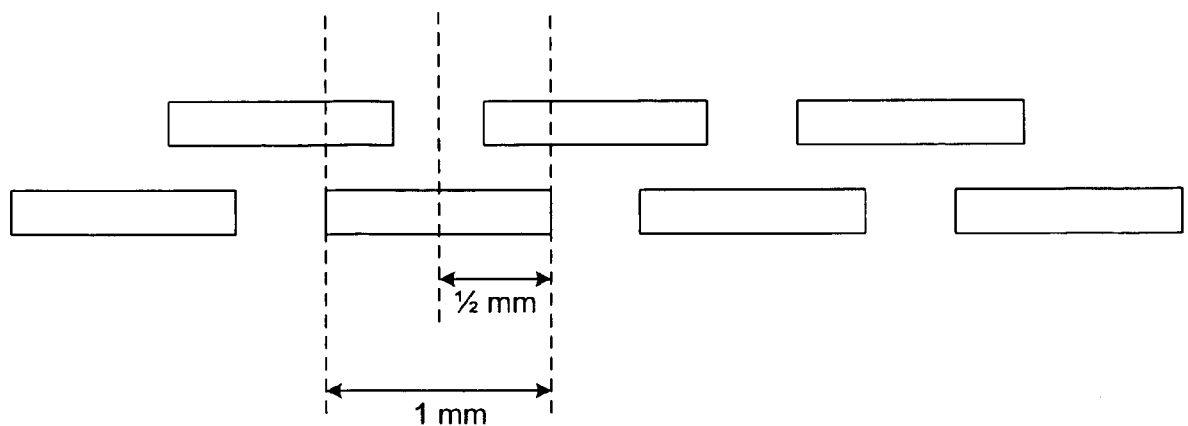
FIG. 3C is a diagram illustrating the improved resolution of the substrate of FIG. 3A.

As illustrated in FIG. 3C for example, the optical elements 32 have a width of approximately 1 mm each. As such, the distance between the interleaved optical elements 32 is approximately ½. The touch screen 14 of FIG. 3B therefore has the ability to resolve interrupts of ½ or greater. In contrast, a substrate 28 with only a single layer of optical elements of approximately 1 mm in width, would have a resolution of only 1 mm, The aforementioned dimensions are exemplary and should not be construed as limiting the invention in anyway. Finer or courser resolution can be achieved by using smaller or larger optical elements 32 respectively.

Figure 4A:
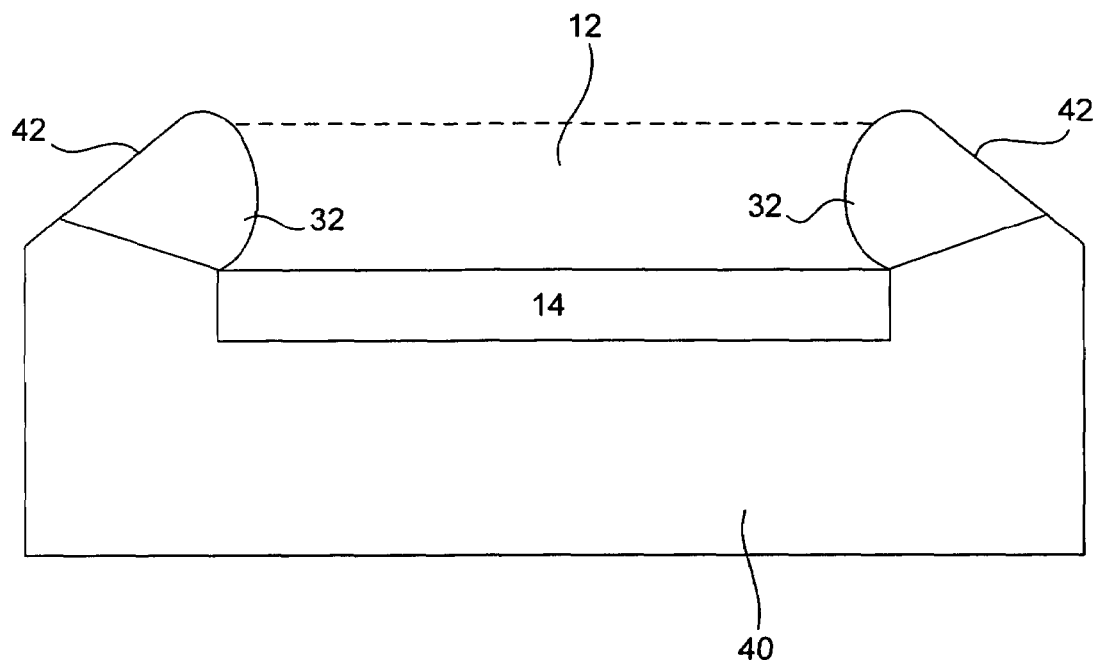
FIG. 4A-4C are diagrams of a folded waveguide substrate according to the present invention.

Referring to FIG. 4A, a cross section of a folded 40 waveguide substrate used with a touch screen 14 according to another embodiment is shown. This embodiment, referred to as a "folded" waveguide, is described in the aforementioned co-pending parent application. In this embodiment, the substrate 40 includes a flat internally reflective surface 42 that allows the waveguides to be folded on to the side surface of the substrate 40. With the waveguides on the side surface, the width of the substrate 28 can be reduced. Like the other embodiments described above, the substrate 40 of FIG. 4A is fabricated and then cut from sheet 30 as described herein.

Figure 4C:
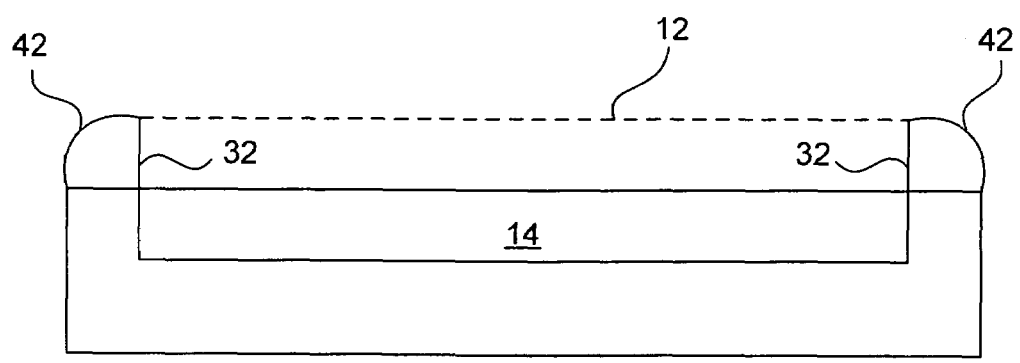
Figure 4B:
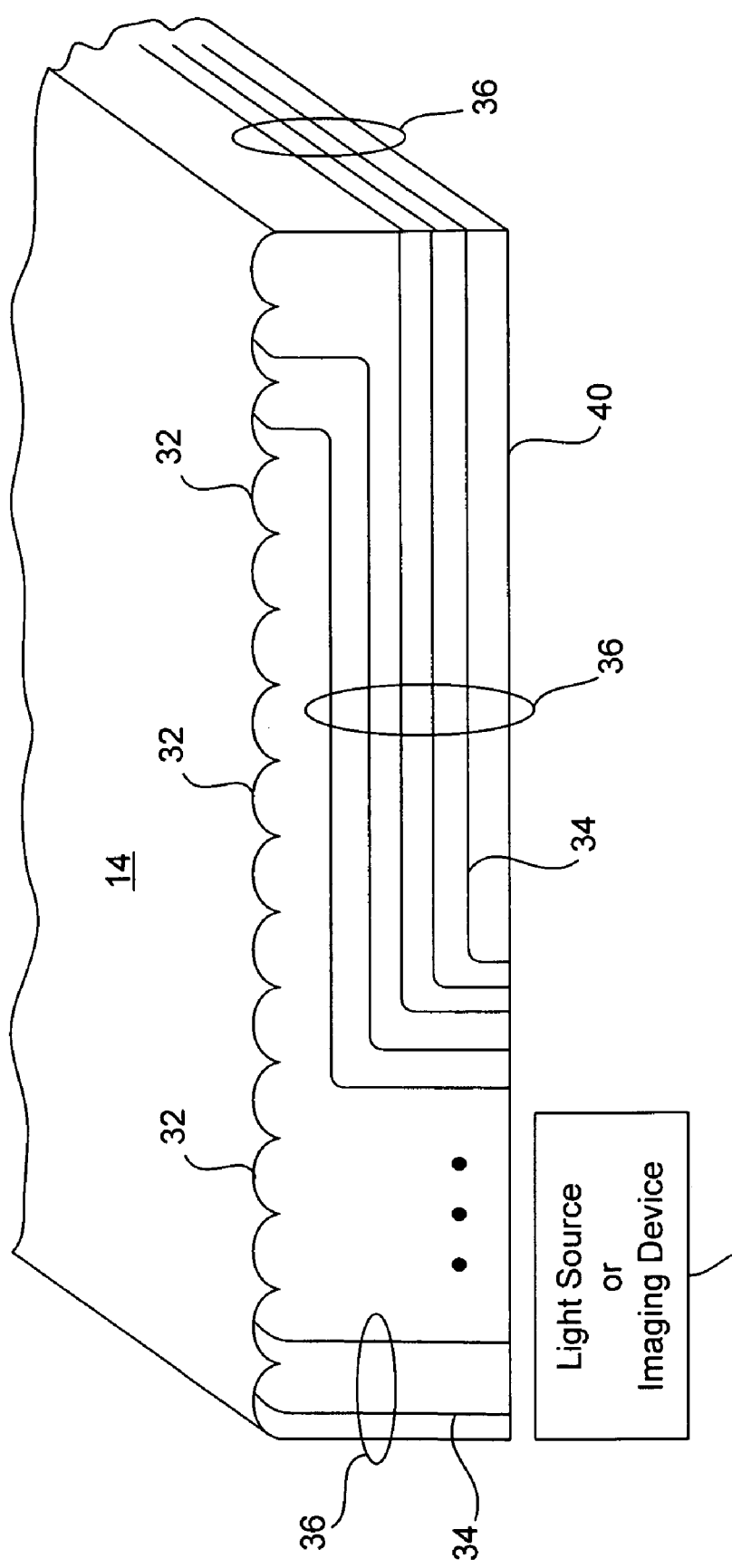

Referring to FIG. 4B, a partial perspective view of the folded waveguide 40 provided around a touch screen display 14 is shown. As illustrated, the optical elements 32 of the waveguide are provide along the top side of the waveguide 40 around the periphery of the touch screen 14. The individual waveguides 34 are folded and are grouped in highways 36 along the side surface of the substrate 40. A light source 38 and imaging device 39 are shown adjacent the where the waveguides 34 terminate.

FIG. 4C, a cross section of a folded 40 waveguide substrate used with a touch screen 14 according to another embodiment is shown. This embodiment, also referred to as a "folded" waveguide, is described in the aforementioned co-pending parent application. In this embodiment, the substrate 40 includes a curved internally reflective surface 42 that allows the waveguides to be folded on to the side surface of the substrate 40. With the waveguides on the side surface, the width of the substrate 28 can be reduced. Like the other embodiments described above, the substrate 40 of FIG. 4C is fabricated and then cut from sheet 30 as described herein.

Figure 5:
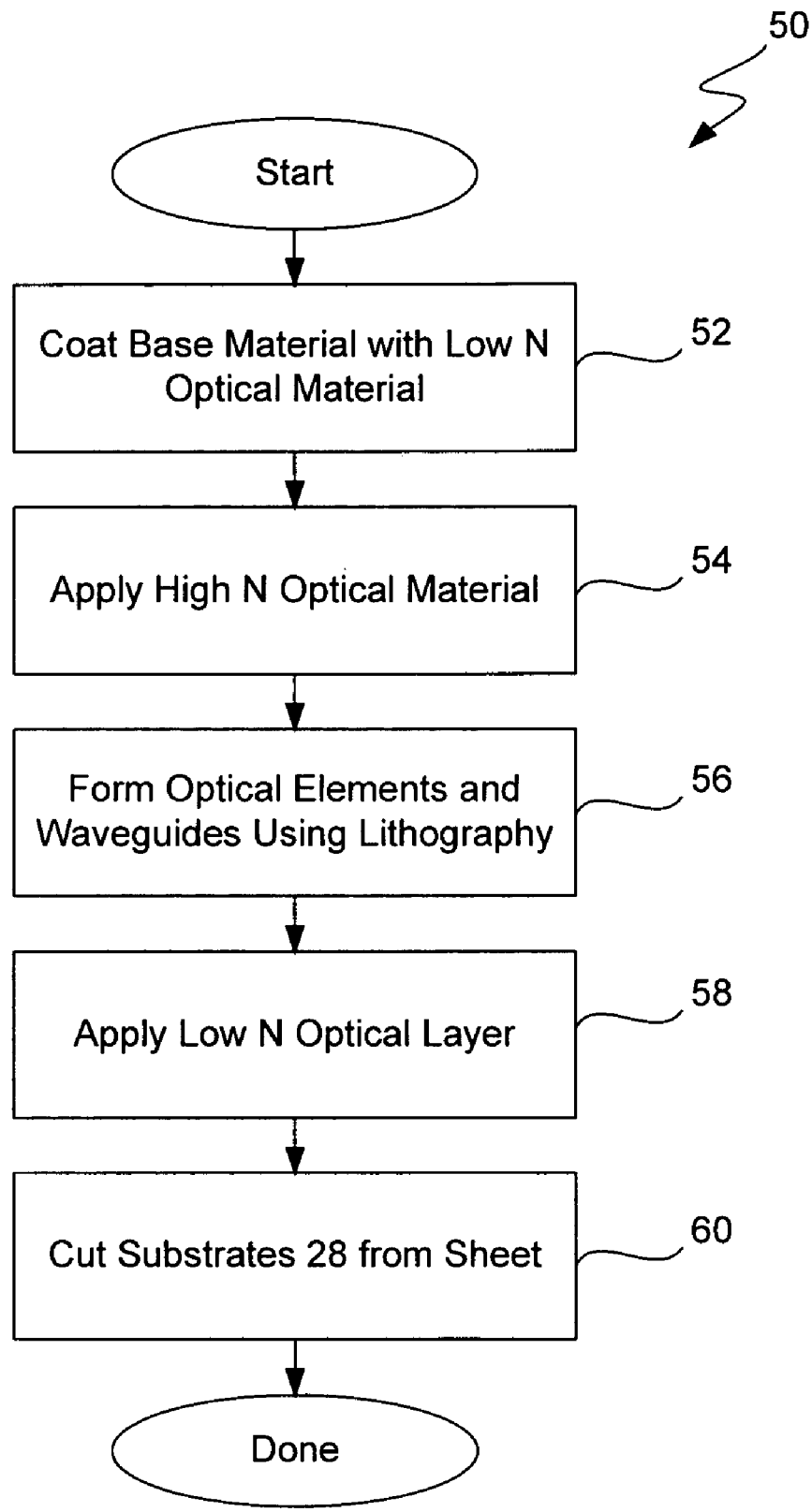
FIG. 5 is a flow diagram illustrating the manufacturing steps for fabricating the waveguide substrates of the present invention.

Referring to FIG. 5, a flow diagram 50 illustrating the manufacturing steps for fabricating the various embodiments of the waveguide substrates 28, 40 and 90 of the present invention is shown. In an initial step (box 52), a low N optical material is coated over the sheet 30. In various embodiments, the sheet 30 is made from flexible, but mechanically strong, material, such as plastic or polycarbonate. The sheet can be either transparent or opaque. According to various embodiments, any low N optically transparent material can be used. In the next step (box 54), a high N optically transparent material is coated over the sheet 30. The optical elements 32 and waveguides 34 are then formed in the high N optically transparent material using photolithography (box 56). Specifically, the high N layer is masked and patterned to form the optical elements 32 and the waveguides 34. Another low N optical layer is then formed over the patterned high N optical layer (box 58). The high N material is thus sandwiched between the two lower N layers, creating an internally reflective surfaces wherever the high N and low N materials are in contact. As a result, the optical elements 32 and waveguides 34 are created. In a final step, the substrates 28 are cut from the sheet 30 (box 60). The multi-layer flexible substrates of FIGS. 3A-3C as well as the substrate of may be fabricated using essentially the same technique. After the first layer of optical elements 32 and waveguides 34 are formed, an intermediate layer is formed over the second N layer. The aforementioned process detailed in steps 52-58 is then repeated.

Figure 6:
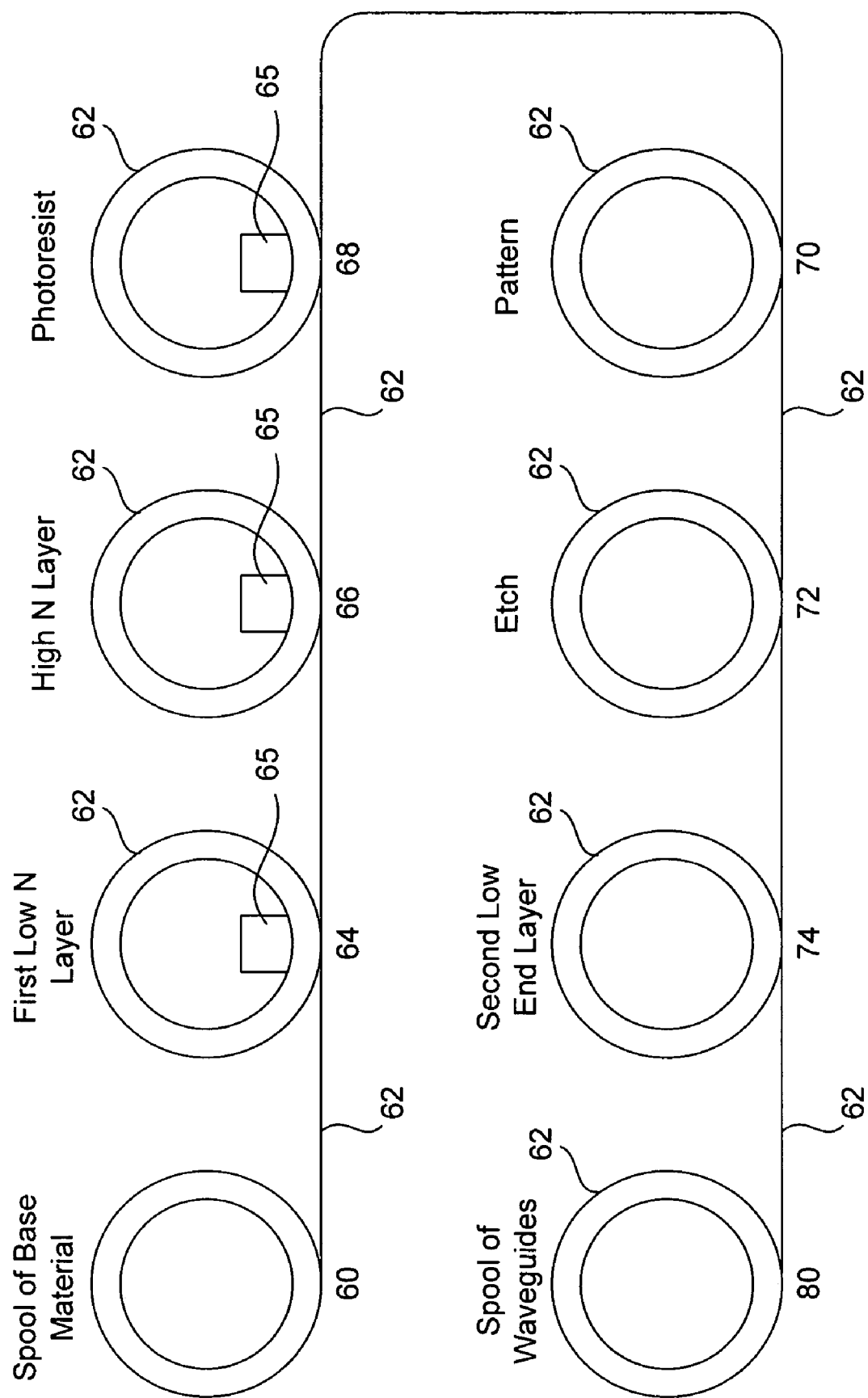
FIG. 6 is a diagram illustrating the manufacture of waveguide substrates according to another embodiment of the invention.

Referring to FIG. 6, a diagram illustrating the manufacture of waveguide substrates according to another embodiment of the invention. With this embodiment, the substrates 28 or 40 are fabricated by passing a continuous strip of base material through a succession of processing stations. Initially at station 60, a spool of the base material 62 is provided. The base material 62 is fed to a processing station 64 where the first low N layer is applied. As the base material rotates around the station 64, a UV curing device 65 cures the first N layer. At station 66, the second high N layer is applied and cured in a similar manner. At station 68, a layer of photo-resist is applied and cured over the second layer. A patterning mask is them applied at station 70. The pattern defines the optical elements 32 and the waveguides 34. Thereafter, portions of the second high N layer that do not form the optical elements 32 and waveguides 34 are etched or removed at station 72. The third low N layer is then applied at station 74. The process strip of waveguide substrates 28 or 40 is then spooled at station 80. In one embodiment, the circumference of each processing station is substantially the same as the length of each waveguide substrate 28 or 40. In this manner, a spool of base material can be fabricated into a plurality of serial waveguide substrates 28 or 40, each of equal length. The spool is later cut at periodic intervals equal to the length of each substrate to singulate the individual substrates Referring to FIGS. 7A and 7B, a diagram illustrating another flexible waveguide according to the present invention is shown. The flexible waveguide substrate 90 includes a plurality of optical elements 32 and corresponding waveguides 34 arranged in two waveguide highways 36a and 36b. The waveguide substrate 90 also includes a fold 92 separating the highways 36a and 36b. The waveguide highway 36a and 36b extend onto the corresponding sides of the fold 92. After the individual substrate is fabricated and singulated (in any one of the ways described above) the waveguide 90 may be folded along the fold. As illustrated in FIG. 7B, the two sides of the flexible waveguide 90 are shown positioned at approximate right angles with respect to one another with the two sides of the fold extend outward. This arrangement makes it convenient for a light source and/or an imaging device (both not shown) to be positioned close too or adjacent to the individual waveguides 34 of the highways 36a and 36b on either side of the fold 92.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. An apparatus, comprising;
    a flexible base material;
    a first optical layer formed on the flexible base material, the first optically transparent layer having a first index of refraction value;
    a second optical layer formed on the first optical layer, the second optical layer being patterned to form a plurality of optical elements and waveguides respectively, the second optical layer having a second index of refraction value higher than the first index of refraction value;
    a third optical layer formed on the second optical layer, the third optical layer having a third index of refraction value lower than the second index of refraction value,
    the base material and first, second and third optical layers forming a flexible waveguide substrate, and
    the apparatus further comprising a light based touch screen having the flexible waveguide substrate formed substantially around the perimeter of the touch screen, a first sub-set of the plurality of optical elements of the flexible waveguide substrate being configured to provide light adjacent to the light based touch screen and a second sub-set of optical elements of the flexible waveguide substrate configured to detect data inputs made to the light based touch screen.

2. The apparatus of claim 1, wherein the first index or refraction value and the third index of refraction value are substantially the same.

3. The apparatus of claim 1, wherein the flexible base material comprises one of the following materials: plastic or polycarbonate.

4. The apparatus of claim 1, wherein the second optical layer is further patterned to form a plurality of internally reflective surfaces between the plurality of optical elements and waveguides respectively.

5. The apparatus of claim 4, wherein the plurality of optical elements are formed on a first surface of the waveguide substrate and the plurality of waveguides are formed on second surface of the waveguide substrate, wherein the first surface and the second surface are substantially at right angles with respect to one another.

6. The apparatus of claim 1, wherein the optical elements comprise one of the following types of optical elements: lenses, diffraction gratings, filters, bragg gratings, or coupling horns.

7. The apparatus of claim 1, wherein the plurality of optical elements patterned in the second optical layer are arranged in multiples layers.

8. The apparatus of claim 7, wherein the plurality of optical elements in the multiples layers are interleaved.

9. The apparatus of claim 1, further comprising a light source optically coupled to the waveguides associated with the first sub-set of optical elements respectively.

10. The apparatus of claim 9, further comprising an imaging device optically coupled to the waveguides associated with the second sub-set of optical elements respectively.

11. An apparatus, comprising
a flexible base material, the flexible base material having a plurality of flexible waveguide substrates formed thereon, each of the flexible waveguide substrates comprising:
a first optical layer formed on the flexible base material, the first optically transparent layer having a first index of refraction value;
a second optical layer formed on the first optical layer, the second optical layer being patterned to form a plurality of optical elements and waveguides respectively, the second optical layer having a second index of refraction value higher than the first index of refraction value;
a third optical layer formed on the second optical layer, the third optical layer having a third index of refraction value lower than the second index of refraction value, and
the apparatus further comprising a light based touch screen having the plurality of flexible waveguide substrates formed in a pattern substantially around the perimeter of the touch screen, a first sub-set of the plurality of optical elements of the flexible waveguide substrate being configured to provide light adjacent to the light based touch screen and a second sub-set of optical elements of the flexible waveguide substrate configured to detect data inputs made to the light based touch screen.

12. The apparatus of claim 11, wherein the plurality of substrates are arranged in parallel strips on the flexible base material.

13. The apparatus of claim 11, wherein the flexible base material is a continuous strip and the flexible waveguides substrates are serially formed on the flexible base material.

14. The apparatus of claim 11, wherein the waveguide substrates comprise a plurality optical elements and waveguides.

15. The apparatus of claim 14, wherein the optical elements are arranged in multiple layers and the optical elements are interleaved.

16. The apparatus of claim 14, wherein the optical elements comprise one of the following types of optical elements: lenses, diffraction gratings, filters, bragg gratings, or coupling horns.

17. The apparatus of claim 11, wherein the flexible waveguide substrates are further patterned to form a plurality of internally reflective surfaces between the plurality of optical elements and waveguides respectively.

18. The apparatus of claim 17, wherein the plurality of optical elements are formed on a first surface of the flexible waveguide substrate and the plurality of waveguides are formed on second surface of the flexible waveguide substrate, wherein the first surface and the second surface are substantially at right angles with respect to one another.

19. A method comprising:
providing a first optical material over a flexible base material, the first optical material having a first index of refraction value;
providing a second optical layer on the first optical layer, the second optical layer having a second index of refraction value higher than the first index of refraction value;
patterning the second optical layer to form a plurality of optical elements and waveguides respectively;
providing a third optical layer formed on the second optical layer, the third optical layer having a third index of refraction value lower than the second index of refraction value,
the base material and first, second and third optical layers forming a flexible waveguide substrate, and
forming the plurality of flexible waveguide substrates in a pattern substantially around the perimeter of a light based touch screen, a first sub-set of the plurality of optical elements of the flexible waveguide substrate being configured to provide light adjacent to the light based touch screen and a second sub-set of optical elements of the flexible waveguide substrate configured to detect data inputs made to the light based touch screen.

20. The method of claim 19, further comprising forming a plurality of the flexible waveguide substrates on the base material.

21. The method of claim 20, wherein the forming the plurality of flexible waveguide substrates further comprises:
providing the first, the second and the third optical layers in side-by-side strips on the base material; and
cutting the base material to singulate the individual flexible waveguide substrates.

22. The method of claim 21, wherein forming the plurality of flexible waveguide substrates further comprises:
providing the first, second and third optical layers serially at spaced intervals on a continuous strip of the flexible base material; and
cutting the continuous flexible base material at the spaced intervals to singulate the individual waveguide substrates.

* * * * *